United States Patent
Tu

(10) Patent No.: US 10,922,055 B2
(45) Date of Patent: Feb. 16, 2021

(54) RANDOM NUMBER GENERATOR AND METHOD FOR GENERATING RANDOM NUMBERS

(71) Applicant: Winbond Electronics Corp., Taichung (TW)

(72) Inventor: Ying-Te Tu, New Taipei (TW)

(73) Assignee: Winbond Electronics Corp., Taichung (TW)

( * ) Notice: Subject to any disclaimer, the term of this patent is extended or adjusted under 35 U.S.C. 154(b) by 142 days.

(21) Appl. No.: 16/410,701

(22) Filed: May 13, 2019

(65) Prior Publication Data

US 2019/0361677 A1    Nov. 28, 2019

(30) Foreign Application Priority Data

May 28, 2018   (TW) .............................. 107118146 A

(51) Int. Cl.
*G06F 7/58* (2006.01)

(52) U.S. Cl.
CPC .................... *G06F 7/584* (2013.01)

(58) Field of Classification Search
CPC ...................................... G06F 7/584
See application file for complete search history.

(56) References Cited

U.S. PATENT DOCUMENTS

| 6,125,182 A | 9/2000 | Satterfield | |
|---|---|---|---|
| 2009/0222501 A1 | 9/2009 | Numminen | |
| 2013/0003979 A1* | 1/2013 | Jeong | H04J 13/10 380/287 |
| 2014/0258721 A1* | 9/2014 | Avanzi | H04W 12/06 713/168 |
| 2017/0102922 A1* | 4/2017 | Steele, Jr. | G06F 7/582 |
| 2018/0074791 A1* | 3/2018 | Atsumi | G06F 7/582 |

FOREIGN PATENT DOCUMENTS

TW    201523436 A    6/2015

* cited by examiner

*Primary Examiner* — Matthew D Sandifer
(74) *Attorney, Agent, or Firm* — Muncy, Geissler, Olds & Lowe, P.C.

(57) ABSTRACT

A random number generator is provided. The random number generator includes a linear feedback shift register and rotator. The linear feedback shift register is configured to provide a first pseudo-random number signal with a first value, wherein the first pseudo-random number signal includes a plurality of bits. The rotator is configured to shift and rotate the plurality of bits of the first pseudo-random number signal according to a signal to generate a second pseudo-random number signal with a second value. The second value is different from the first value.

10 Claims, 8 Drawing Sheets

| RNS1 | RNS2a |
|---|---|
| 578<br>(1001000010) | 289<br>(0100100001) |
| 264<br>(0100001000) | 132<br>(0010000100) |
| 327<br>(0101000111) | 675<br>(1010100011) |
| 920<br>(1110011000) | 460<br>(0111001100) |
| ⋮ | ⋮ |

| RNS1 | RNS2b |
|---|---|
| 578 (1001000010) | 266 (0100001010) |
| 264 (0100001000) | 33 (0000100001) |
| 327 (0101000111) | 285 (0100011101) |
| 920 (1110011000) | 611 (1001100011) |
| ⋮ | ⋮ |

# RANDOM NUMBER GENERATOR AND METHOD FOR GENERATING RANDOM NUMBERS

CROSS REFERENCE TO RELATED APPLICATIONS

This Application claims priority of Taiwan Patent Application No. 107118146, filed on May 28, 2018, the entirety of which is incorporated by reference herein.

BACKGROUND OF THE INVENTION

Field of the Invention

The invention relates to a random number generator, and more particularly to a random number generator for generating a plurality of random number sequences.

Description of the Related Art

As technology advances, the dynamic random access memory (DRAM) devices continue to be miniaturized, making them more and more dense, and the memory devices are placed closer to each other. As a result, the charge generated in a memory device may easily leak to an adjacent memory device, and the bit flip phenomenon may occur, generating error signals. This phenomenon is called the row hammer effect.

In memory applications (e.g., DRAM), refresh operations are typically used to solve the row hammer effect. When a refresh operation is performed, the word (row) lines in the memory are randomly accessed to avoid bit flips. In general, a random number generator is typically used to generate random numbers to access the corresponding word line based on a random sequence formed by the random numbers.

Therefore, a random number generator capable of rearrange random numbers is desired.

BRIEF SUMMARY OF THE INVENTION

An embodiment of a random number generator is provided. The random number generator includes a linear feedback shift register and rotator. The linear feedback shift register is configured to provide a first pseudo-random number signal with a first value, wherein the first pseudo-random number signal includes a plurality of bits. The rotator is configured to shift and rotate the plurality of bits of the first pseudo-random number signal according to a signal, to generate a second pseudo-random number signal with a second value. The second value is different from the first value.

Furthermore, an embodiment of a method for generating random numbers is provided. A first pseudo-random number sequence is provided. Binary codes of the first values of the first pseudo-random number signal are shifted and rotated according to a control signal and a pulse signal to generate a second pseudo-random number sequence. The shift amount and shift direction of bits of the binary code of the first values are respectively determined by the pulse signal and the control signal. The first pseudo-random number sequence is different from the second pseudo-random number sequence.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
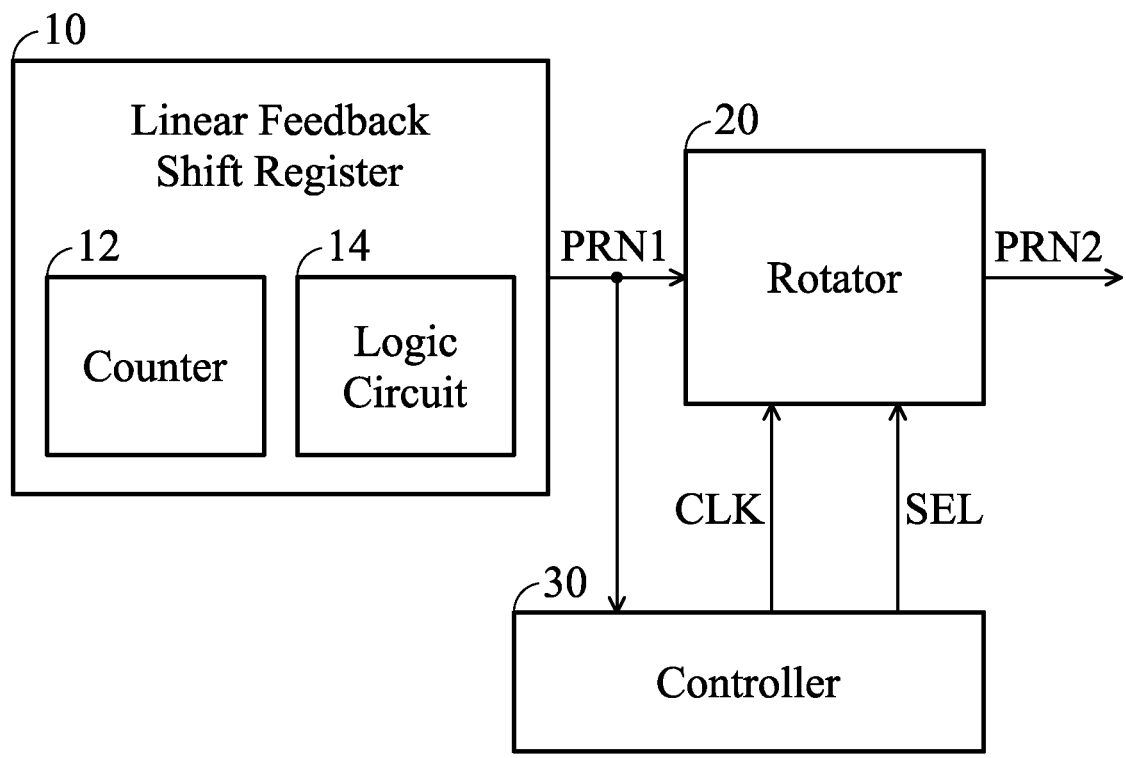
FIG. 1 shows a random number generator according to an embodiment of the invention.

FIG. 1 shows a random number generator 100 according to an embodiment of the invention. The random number generator 100 includes a linear feedback shift register (LFSR) 10, a rotator 20 and a controller 30. The LFSR 10 includes a counter 12 and a logic circuit 14. The counter 12 includes a plurality of registers (e.g., D-type flip-flops). In some embodiments, the registers of the counter 12 are coupled in series. The logic circuit 14 includes a plurality of logical operating devices, such as OR gates, AND gates, XOR gates, XNOR gates and so on. Furthermore, the LFSR 10 is configured to provide a pseudo-random number signal PRN1 to the rotator 20, wherein the pseudo-random number signal PRN1 has a plurality of bits. In some embodiments, number of bits in the pseudo-random number signal PRN1 is determined by the maximum value that the counter 12 can provide. In the LFSR 10, the logical operating devices of the logic circuit 14 are configured to perform logical operations on a portion of bits of the counter 12 (e.g., outputs of some registers), thus providing a number that is not repeated within a specific value range. For example, assuming that number of bits of the pseudo-random number signal PRN is 10, the range of values counted by the counter 12 is sequentially from a minimum value of 1 (i.e., $2^0$) to a maximum value of 1023 (i.e., $2^{10-1}$), e.g., 1, 2, 3 . . . 1023. In some embodiments, the minimum value is the smallest positive integer that can be provided by number of bits of the pseudo-random number signal PRN, and the maximum value is the largest positive integer that can be provided by number of bits of the pseudo-random number signal PRN. After the logical operating devices of the logic circuit 14 are add into a portion of bits of the counter 12, the values of the pseudo-random number signal PRN1 are appear in random order to form a random number sequence RNS1, such as 578, 264, 327, 920 and so on. During the counting of the counter 12 by 1023, the value in the random number sequence RNS1 is not repeated. In other words, in the random number sequence RNS1, the number of occurrences of each value in the range between the maximum value 1023 and the minimum value 1 is one, i.e., each value is not repeated. After the counter 12 counts 1023 times, the value of the pseudo-random number signal PRN1 will return to the order of 578, 264, 327, and 920 and so on. Therefore, in each counting period of the counter 12 (e.g., 1023 counts), the LFSR 10 is configured to provide the pseudo random number signal PRN1 with the random number sequence RNS1 to the rotator 20. Moreover, for different counting periods, the LFSR 10 is configured to generate the same random number sequence RNS1 and to sequentially provide the random number sequence RNS1 to the rotator 20 through the pseudo-random number signal PRN1.

In the random number generator 100, the LFSR 10 also provides the pseudo-random number signal PRN1 to the controller 30. By detecting the random number sequence RNS1 of the pseudo-random number signal PRN1, the controller 30 is configured to determine the interval of each counting period (e.g., start and end of the counting period). For example, when detecting that the value in the random number sequence RNS1 is repeated, the controller 30 can determine that a new counting period has started. Furthermore, in response to various counting periods, the controller 30 is configured to provide the corresponding pulse signal CLK and the corresponding control signal SEL to the rotator 20. In some embodiments, the LFSR 10 is configured to provide other signals to inform the controller 30 about the interval of the counting periods. In some embodiments, the counting periods of the counter 12 in the LFSR 10 are determined according to control signals and/or clock signals from other circuits (not shown), and the control signals and/or clock signals also notify the controller 30 about the interval of the counting periods.

In each counting period, in response to the pulse signal CLK and the control signal SEL, the rotator 20 is configured to shift the binary code of each value of the random number sequence RNS1 to the right (i.e., to the least significant bit (LSB)) or to the left (i.e., to the most significant bit (MSB)) and to rotate a specific number of bits.

Figures 2A, 2B:
FIG. 2A is a schematic illustrating how the rotator shifts and rotates the binary code of each value in the random number sequence RNS1 to the right according to an embodiment of the invention.
FIG. 2B shows a table of the random number sequences RNS1 and RNS2$a$.

FIG. 2A is a schematic illustrating how the rotator 20 shifts and rotates the binary code of each value in the random number sequence RNS1 to the right according to an embodiment of the invention. For example, assuming that the pulse signal CLK and the control signal SEL indicate that the binary code of each value in the random number sequence RNS1 is shifted to the right and rotated by one bit (i.e., shifting one bit to the least significant bit (LSB)), the rotator 20 is configured to convert the value "578" (the binary code is "1001000010") of the random number sequence RNS1 into the value "289" (the binary code is "0100100001") of the random number sequence RNS2a, to convert the value "264" (the binary code is "0100001000") of the random number sequence RNS1 into the value "132" (the binary code is "0010000100") of the random number sequence RNS2a, to convert the value "327" (the binary code is "0101000111") of the random number sequence RNS1 into the value "675" (the binary code is "1010100011") of the random number sequence RNS2a, and to convert the value "920" (the binary code is "1110011000") of the random number sequence RNS1 into the value "460" (the binary code is "0111001100") of the random number sequence RNS2a and so on, as shown in the table in FIG. 2B.

Figures 3A, 3B:
FIG. 3A is a schematic illustrating how the rotator shifts and rotates the binary code of each value in the random number sequence RNS1 to the left according to an embodiment of the invention.
FIG. 3B shows a table of the random number sequences RNS1 and RNS2$b$.

FIG. 3A is a schematic illustrating how the rotator 20 shifts and rotates the binary code of each value in the random number sequence RNS1 to the left according to an embodiment of the invention. For example, assuming that the pulse signal CLK and the control signal SEL indicate that the binary code of each value in the random number sequence RNS1 is shifted to the left and rotated by two bits (i.e., shifting two bits to the most significant bit (MSB)), the rotator 20 is configured to convert the value "578" (the binary code is "1001000010") of the random number sequence RNS1 into the value "266" (the binary code is "0100001010") of the random number sequence RNS2b, to convert the value "264" (the binary code is "0100001000") of the random number sequence RNS1 into the value "33" (the binary code is "0000100001") of the random number sequence RNS2b, to convert the value "327" (the binary code is "0101000111") of the random number sequence RNS1 into the value "285" (the binary code is "0100011101") of the random number sequence RNS2b, to convert the value "920" (the binary code is "1110011000") of the random number sequence RNS1 into the value "611" (the binary code is "1001100011") of the random number sequence RNS2b and so on, as shown in the table in FIG. 3B.

As described above, in the random number sequences RNS1, RNS2a and RNS2b, the number of occurrences of each value in the value range between the maximum value 1023 and the minimum value 1 is one. That is, it is not repeated. Furthermore, in each of the random number sequences RNS1, RNS2a, and RNS2b, the order of the values is different. For example, the random number sequence RNS1 has a value order of 578, 264, 327, and 952. The random number sequence RNS2a has a value order of 289, 132, 675, and 460. The random number sequence RNS2b has a value order of 266, 33, 285, and 611.

Figure 4A:
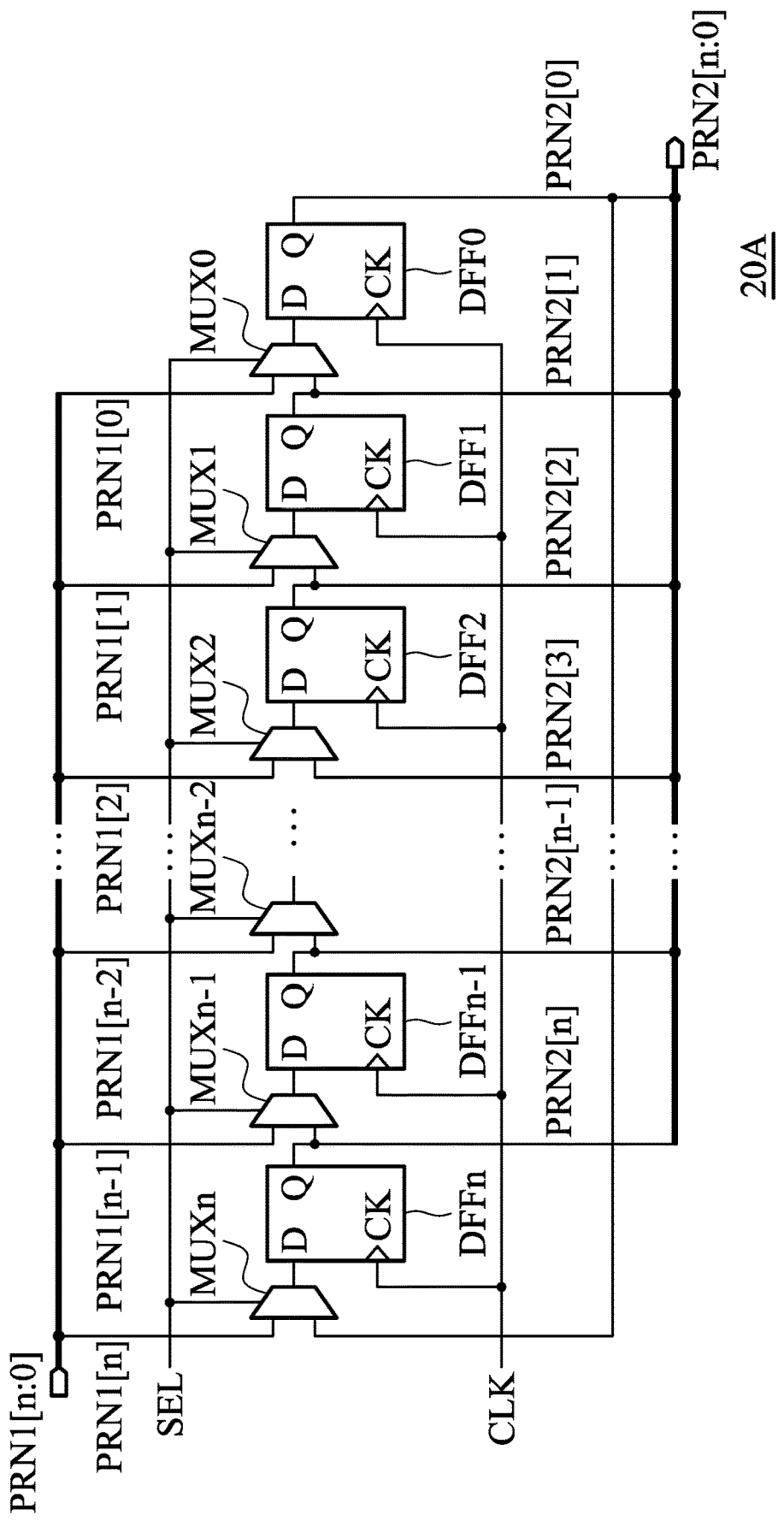
FIG. 4A shows a rotator according to an embodiment of the invention.

FIG. 4A shows a rotator 20A according to an embodiment of the invention. In response to the pulse signal CLK and the control signal SEL, the rotator 20A is configured to shift the binary code of each value in the random number sequence RNS1 of the pseudo-random number signal PRN1 to the right by a specific number of bits and to rotate (or feedback). The rotator 20A includes a plurality of D-type flip-flops DFF0-DFFn and a plurality of multiplexers MUX0-MUXn. The outputs of the multiplexers MUX0-MUXn are coupled to the input terminals (labeled as "D") of the corresponding D-type flip-flops DFF0-DFFn, respectively. The pulse signal CLK from the controller 30 is provided to the clock terminals (labeled as "CK") of the D-type flip-flops DFF0-DFFn. The output terminals (labeled as "Q") of the D-type flip-flops DFF0-DFFn are coupled to the input terminals of the corresponding multiplexers MUX0-MUXn, respectively. The multiplexers MUX0-MUXn selectively provide the specific bits of the pseudo-random number signal PRN1 or PRN2 to the input terminals of the corresponding D-type flip-flops DFF0-DFFn according to the control signal SEL. For example, in response to the control signal SEL, the multiplexer MUXn is configured to provide the bit PRN1[$n$] of the pseudo-random number signal PRN1 or the bit PRN2[0] of the pseudo-random number signal PRN2 to the input terminal of the D-type flip-flop DFFn, wherein the bit PRN2[0] of the pseudo-random number signal PRN2 is from the output terminal of the D-type flip-flop DFF0. Furthermore, in response to the pulse signal CLK, the D-type flip-flop DFFn is configured to generate the bit PRN2[$n$] of the pseudo-random number signal PRN2 according to the output of the multiplexer MUXn. Similarly, in response to the control signal SEL, the multiplexer MUXn−1 is configured to provide the bit PRN1[$n$−1] of the pseudo-random number signal PRN1 or the bit PRN2[$n$] of the pseudo-random number signal PRN2 to the input terminal of the D-type flip-flop DFFn−1. As described above, the bit PRN2[$n$] of the pseudo-random number signal PRN2 is from the output terminal of the D-type flip-flop DFFn. Moreover, in response to the pulse signal CLK, the D-type flip-flop DFFn−1 is configured to generate the bit PRN2[$n$−1] of the pseudo-random number signal PRN2 according to the output of the multiplexer MUXn−1 and so on. In addition, the pseudo-random number signals PRN1 and PRN2 have the same number of bits.

Figure 4B:
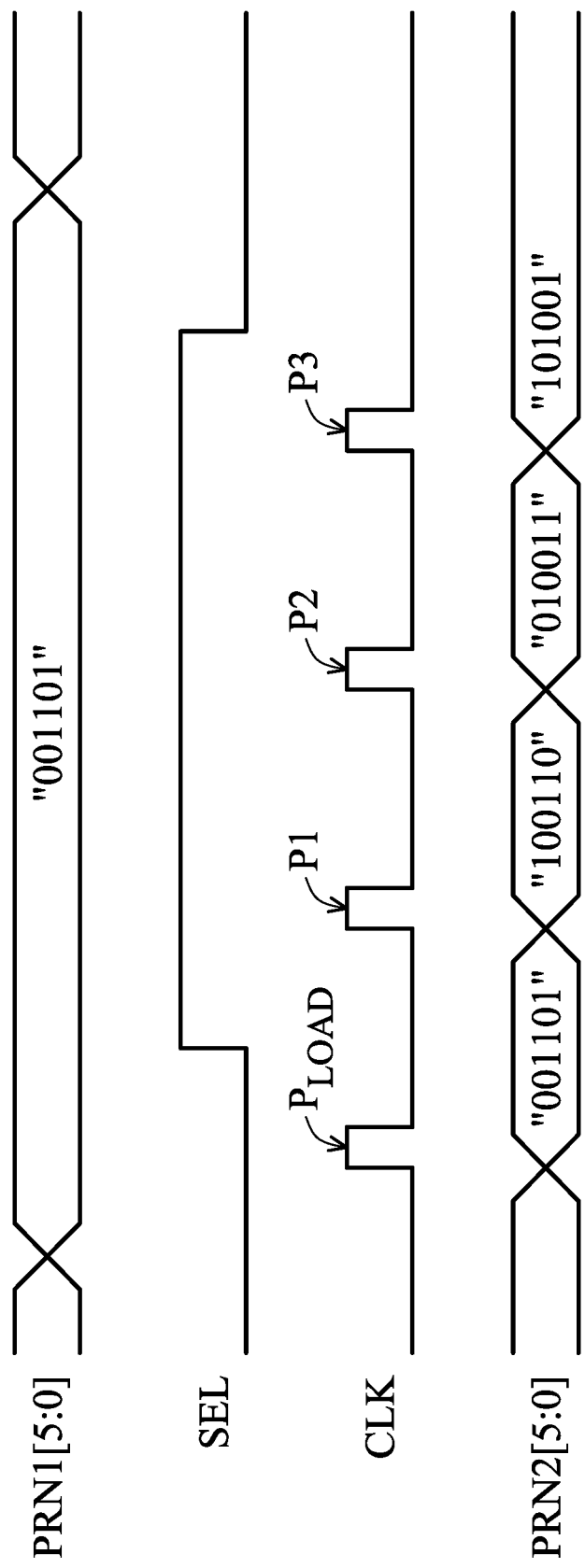
FIG. 4B shows a signal waveform diagram of the rotator of FIG. 4A according to an embodiment of the invention.

FIG. 4B shows a signal waveform diagram of the rotator 20A of FIG. 4A according to an embodiment of the invention. In the embodiment, for convenience of explanation, it is assumed that number of bit of the pseudo-random number signals PRN1 and PRN2 is 6, i.e., n=5. Furthermore, in response to the pulse signal CLK and the control signal SEL, the rotator 20A is configured to shift the binary code of each value in the random number sequence RNS1 to the right by 3 bits and to rotate. First, the control signal SEL is at a low logic level, and the multiplexers MUX0-MUX5 provide the corresponding bits of the pseudo-random number signal PRN1 to the input terminals of the D-type flip-flops DFF0-DFF5, respectively. When it is detected that the value of the pseudo-random number signal PRN1 is changed to "13" (the binary code is "001101"), the controller 30 of FIG. 1 is configured to provide a load pulse $P_{LOAD}$ to the clock terminals of the D-type flip-flops DFF0-DFF5 through the pulse signal CLK. Thus, in response to the load pulse $P_{LOAD}$, the D-type flip-flops DFF0-DFF5 are configured to provide the pseudo-random number signal PRN2 with the binary code "001101" according to the binary code "001101" output by the multiplexers MUX0-MUX5. Next, the controller 30 provides the control signal SEL with a high logic level to the multiplexers MUX0-MUX6. When the control signal SEL is at a high logic level, the multiplexers MUX0-MUXn provide the corresponding bits of the pseudo-random number signal PRN2 to the input terminals of the D-type flip-flops DFF0-DFF5. Next, the controller 30 of FIG. 1 is configured to sequentially provide three shift pulses P1, P2 and P3 to the clock terminals of the D-type flip-flops DFF0-DFF5 through the pulse signal CLK. Thus, in response to the shift pulses P1, P2 and P3, the D-type flip-flops DFF0-DFF5 sequentially provide the pseudo-random number signal PRN2 with the binary codes "100110", "010011" and "101001" according to the binary codes of the pseudo-random number signal PRN2 output by the multiplexers MUX0-MUX5. Therefore, in response to the pulse signal CLK and the control signal SEL, the rotator 20A shifts the binary code "001101" of the pseudo-random number signal PRN1 to the right by 3 bits and rotates, to obtain the pseudo-random number signal PRN2 with the binary code "101001". Specifically, by controlling the number of shift pulses of the pulse signal CLK, the shift amount of the binary code is determined.

Figure 5:
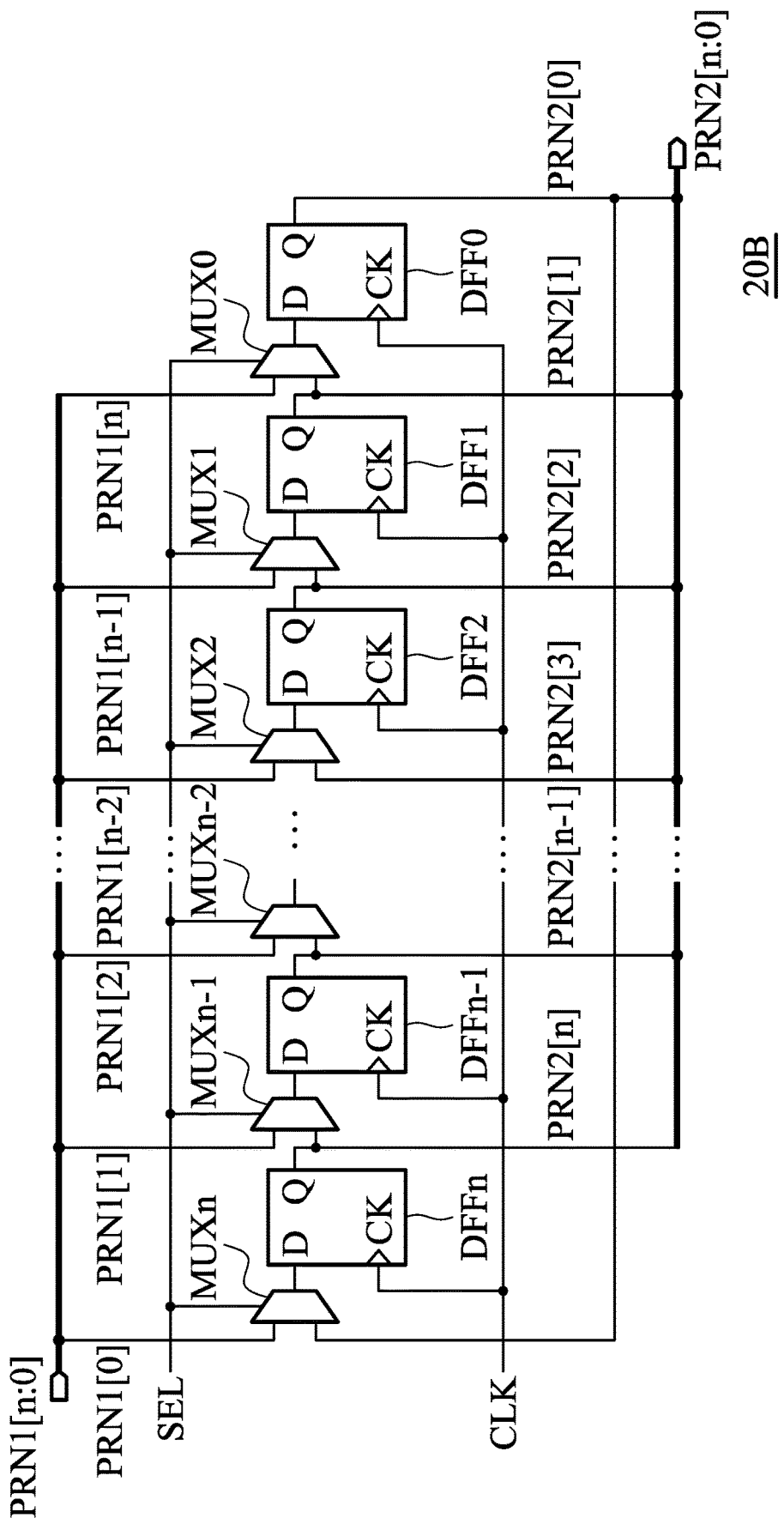
FIG. 5 shows a rotator according to an embodiment of the invention.

FIG. 5 shows a rotator 20B according to an embodiment of the invention. In response to the pulse signal CLK and the control signal SEL, the rotator 20B is configured to shift the binary code of each value of the random number sequence PRN1 in the random number sequence RNS1 to the left by a specific number of bits and to rotate (or feedback). In the rotator 20B, each bit of the pseudo-random number signal PRN1 and the multiplexer MUX0-MUXn are configured differently than the rotator 20A of FIG. 4A. For example, in the rotator 20A of FIG. 4A, the bit PRN1[$n$], the bit PRN1[$n$−1], the bit PRN1[$n$−2] . . . , the bit PRN1[1] and the bit PRN1[0] of the pseudo random number signal PRN1 are sequentially assigned to the multiplexes MUXn-MUX0. However, in the rotator 20B of FIG. 5, the bit PRN1[$n$], the bit PRN1[$n$−1], the bit PRN1[$n$−2] . . . , the bit PRN1[1], the bit PRN1[0] are sequentially assigned to the multiplexes MUX0-MUXn.

In some embodiments, the rotator 20A or 20B may include other circuits, so as to selectively control the configuration of each bit of the pseudo-random number signal PRN1 and the multiplexer MUX0-MUXn according to the control signal SEL or other control signals for shifting the bits of the value to the right or left. Taking the multiplexer MUXn as an example, an additional multiplexer can be used to selectively provide the bit PRN1[$n$] of the pseudo-random number signal PRN1 to the multiplexer MUXn, so that the bits of the value are shifted to right, or selectively provide the bit PRN1[0] of the pseudo-random number signal PRN1 to the multiplexer MUXn, so that the bits of the value are shifted to left.

Figure 6:
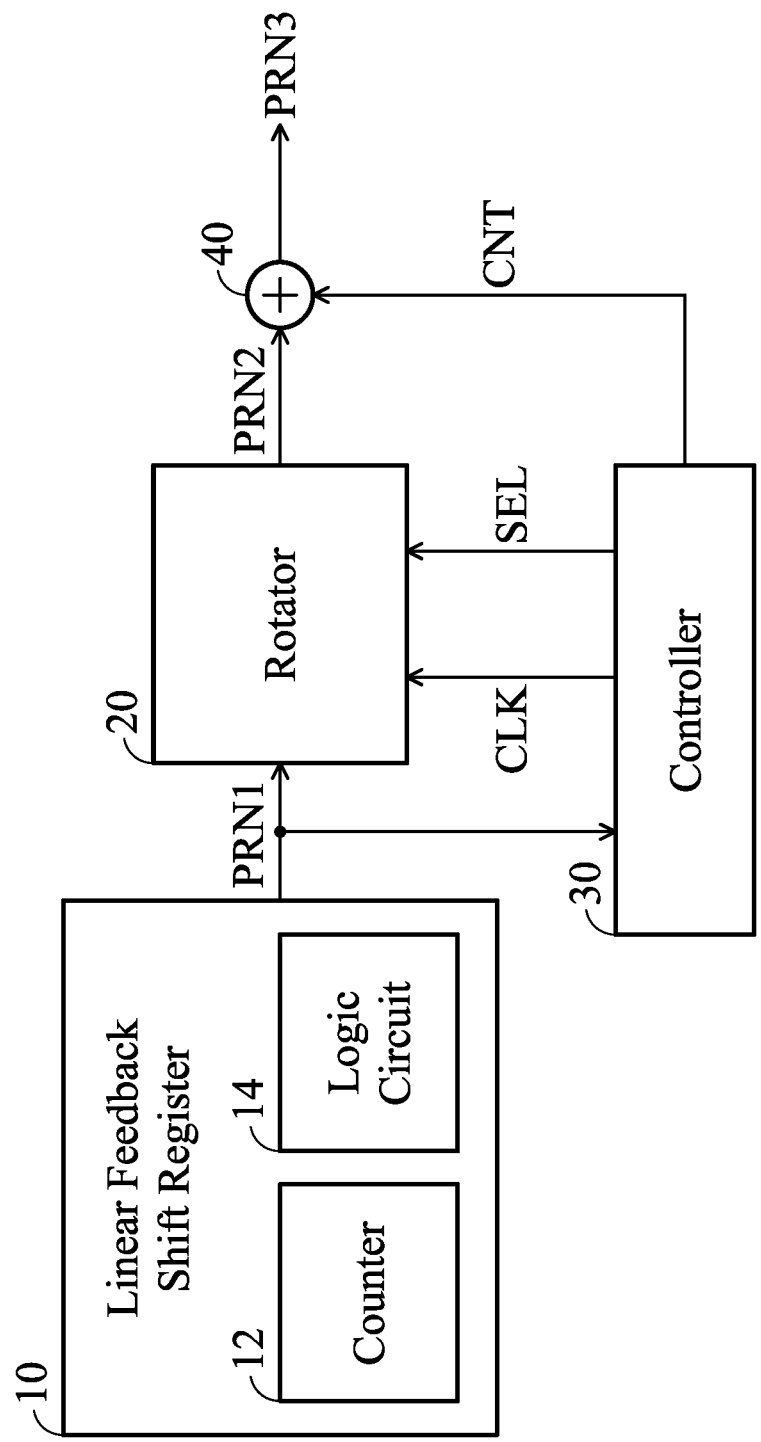
FIG. 6 shows a random number generator according to an embodiment of the invention.

FIG. 6 shows a random number generator 200 according to an embodiment of the invention. Compared to the random number generator 100 of FIG. 1, the random number generator 200 further includes an adder 40 for adding the value CNT provided by the controller 30 into the value of the pseudo-random number signal PRN2, to generate the pseudo-random number signal PRN3. It should be noted that the value CNT is a fixed value in the same counting period. Moreover, the value CNT can be a positive integer value or a negative integer value. Furthermore, the controller 30 can provide different values CNT for different counting periods. In some embodiments, the value CNT may be a random value.

Figure 7:
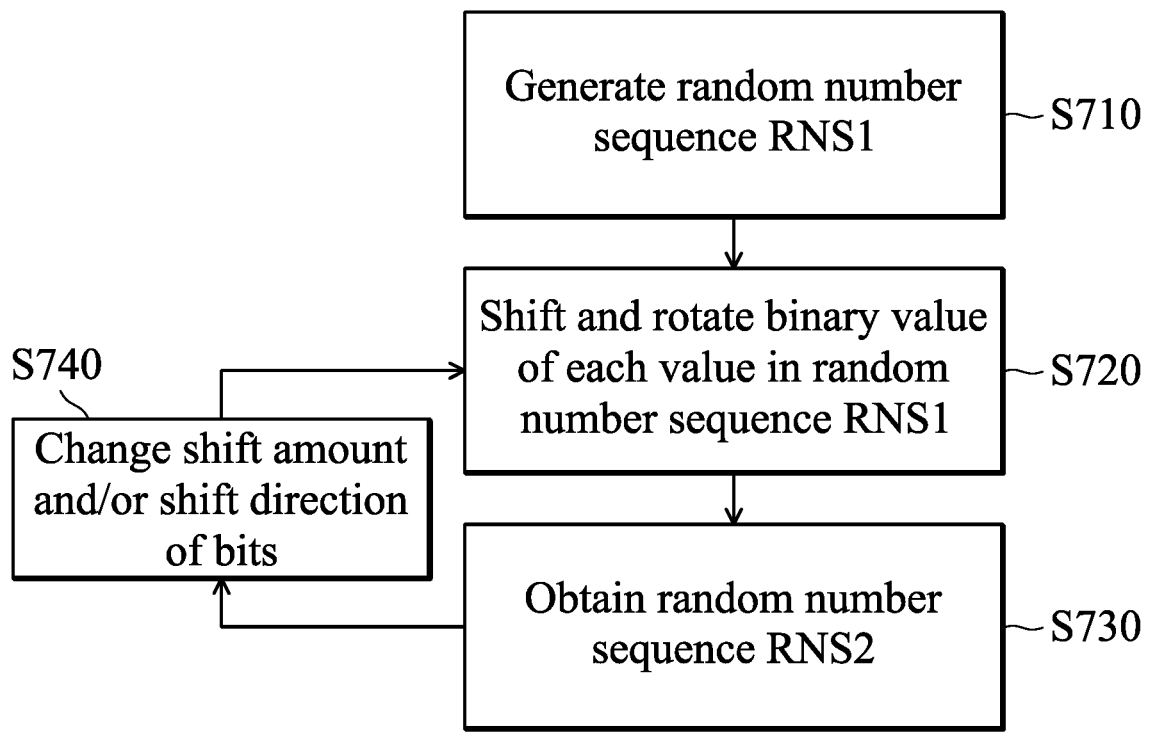
FIG. 7 shows a method for generating random numbers according to an embodiment of the invention.

FIG. 7 shows a method for generating random numbers according to an embodiment of the invention. First, in step S710, the random number sequence RNS1 is generated. In some embodiments, the random number sequence RNS1 is generated by the LFSR 10. As described above, the random number sequence RNS1 consists of values that are not repeated, and each value is in the range between the maximum and minimum values. Next, the controller 30 controls the rotator 20, so as to shift and rotate the binary code of each value in the random number sequence RNS1 (step S720), to obtain the random number sequence RNS2 (step S730), e.g., the random number sequence RNS2$a$ of FIG. 2B. In some embodiments, the shift amount and shift direction of bits are determined by the controller 30. Next, in step S740, the controller 30 changes the shift amount and/or shift direction of bits. Next, in step S720, according to the changed shift amount and/or the changed shift direction of bits, the binary code of each value in the random number sequence RNS1 is shifted and rotated, so as to obtain another random number sequence RNS2 (step S730), e.g., the random number sequence RNS2$b$ of FIG. 3B. Thus, according to the same random number sequence RNS1, different random number sequences RNS2$a$ and RNS2$b$ are obtained. Moreover, a value CNT having a fixed value may be added into or subtracted from each value in the random number sequence RNS2, so as to obtain another random number sequence different from the random number sequence RNS2.

For different counting periods, by using the rotator 20, different random number sequences RNS2 and RNS3 are provided according to the same random number sequence RNS1. Thus, the random values generated by the random number generator will be more complicated to reduce the predictability of pseudo-random numbers. Therefore, in the memory, the random number generator having the rotator 20 can more effectively eliminate the row hammer effect.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A random number generator, comprising:
    a linear feedback shift register, providing a first pseudo-random number signal with a first value, wherein the first pseudo-random number signal includes a plurality of bits; and
    a rotator, shifting and rotating the plurality of bits of the first pseudo-random number signal according to a signal, to generate a second pseudo-random number signal with a second value,
    wherein the second value is different from the first value.

2. The random number generator as claimed in claim 1, wherein shift amount or shift direction of the plurality of bits of the first pseudo-random number signal is determined by the signal.

3. The random number generator as claimed in claim 1, wherein when the first value provided by the linear feedback shift register is repeated, the rotator changes the shift amount or the shift direction of the plurality of bits of the first pseudo-random number signal according to the signal, so as to provide the second pseudo-random number signal with a third value according to the first pseudo-random number signal with the first value, wherein the third value is different from the second value, and the first, second and third values are between a maximum value and a minimum value.

4. The random number generator as claimed in claim 1, wherein the first pseudo-random number signal has the same number of bits as the second pseudo-random number signal.

5. The random number generator as claimed in claim 1, further comprising:
    an adder, adding a fixed value to the second value of the second pseudo-random number signal, to obtain a third pseudo-random number signal with a fourth value,
    wherein the fixed value is a positive integer value or a negative integer value.

6. The random number generator as claimed in claim 1, wherein the rotator comprises:
    a plurality of registers coupled in series, wherein each of the registers has an input terminal, an output terminal, and a clock terminal for receiving a pulse signal; and
    a plurality of multiplexers, wherein each of the multiplexers selectively couple a specific bit of the first pseudo-random number signal or the output terminal of a first register of the plurality of registers, to the input terminal of a second register of the plurality of registers according to the signal,
    wherein the second pseudo-random number signal is provided by the output terminals of the plurality of registers, and shift amount of the plurality of bits is determined according to the amount of pulses in the pulse signal.

7. A method for generating random numbers, comprising:
    providing a first pseudo-random number sequence with a linear feedback shift register; and
    shifting and rotating binary codes of a plurality of first values of the first pseudo-random number sequence with a rotator according to a control signal and a pulse signal, to generate a second pseudo-random number sequence,
    wherein shift amount and shift direction of bits of the binary code of the first values are respectively determined by the pulse signal and the control signal,
    wherein the first pseudo-random number sequence is different from the second pseudo-random number sequence.

8. The method as claimed in claim 7, wherein the plurality of first values are between a maximum value and a minimum value and have different binary codes.

9. The method as claimed in claim 7, further comprising:
    changing the shift amount or the shift direction using the control signal and the pulse signal, after the second pseudo-random number sequence is generated; and
    shifting and rotating the binary codes of the plurality of first values of the first pseudo-random number sequence according to the changed shift amount shift or the changed shift direction, to generate a third pseudo-random number sequence.

10. The method as claimed in claim 7, further comprising:
    adding a fixed value to a plurality of second values of the second pseudo-random number sequence to obtain a fourth pseudo-random number sequence,
    wherein the fixed value is a positive integer value or a negative integer value.

* * * * *